(12) United States Patent
Hagmann (10) Patent No.: US 10,006,933 B2
(45) Date of Patent: *Jun. 26, 2018

(54) METHOD OF CARRIER PROFILING UTILIZING DIELECTRIC RELAXATION

(71) Applicant: Mark J. Hagmann, Salt Lake City, UT (US)

(72) Inventor: Mark J. Hagmann, Salt Lake City, UT (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/369,585

(22) Filed: Dec. 5, 2016

(65) Prior Publication Data

US 2017/0199221 A1 Jul. 13, 2017

Related U.S. Application Data

(60) Provisional application No. 62/276,678, filed on Jan. 8, 2016.

(51) Int. Cl.
*G01Q 60/10* (2010.01)
*G01Q 60/12* (2010.01)

(52) U.S. Cl.
CPC .................................. *G01Q 60/12* (2013.01)

(58) Field of Classification Search
CPC .. G01R 27/00; G01R 27/205; G01R 27/2648; B82Y 35/00; B82Y 10/00; G01N 22/00; G01Q 60/14
See application file for complete search history.

(56) References Cited

U.S. PATENT DOCUMENTS

| | | | |
|---|---|---|---|
| 5,065,103 A | 11/1991 | Slinkman et al. | |
| 5,585,734 A * | 12/1996 | Meuris | G01R 27/00 324/454 |
| 8,601,607 B2 * | 12/2013 | Hagmann | B82Y 35/00 850/26 |
| 9,442,078 B2 * | 9/2016 | Hagmann | G01Q 60/14 |
| 2015/0247809 A1 | 9/2015 | Hagmann | |

OTHER PUBLICATIONS

K. Arstila, T. Hantschel, C. Demeulemeester, A Moussa and W. Vandervorst, "Microfabricated Diamond Tip for Nanoprobing," Microelectron, (2009) 1222-1225, Eng. 86.
L. Zhang, H. Tanimoto, K. Adachi and A. Nishiyama, "1-nm Spatial Resolution in Carrier Profiling of Ultrashallow Junctions by Scanning Spreading Resistance Microscopy," IEEE Electron Dev. (2008) 799-801 Lett. 29.

(Continued)

*Primary Examiner* — Phillip A Johnston
*Assistant Examiner* — Hsien Tsai
(74) *Attorney, Agent, or Firm* — Dobbin IP Law P.C.; Geoffrey E. Dobbin (57) ABSTRACT

A mode-locked laser injects pulses of minority carriers into a semiconductor sample. A microwave frequency comb is then generated by the currents formed in the movement of majority carriers native to the semiconductor and the injected minority carriers. These carriers move to cause dielectric relaxation in the sample, which can be used to determine carrier density within the sample. Measurements require close proximity of transmitter and receiver contacts with the sample and may profile a semi-conductor with a resolution of approximately 0.2 nm.

4 Claims, 4 Drawing Sheets

(56) References Cited

OTHER PUBLICATIONS

K. Mylvaganam, L.C. Zhang, P. Eyben, J. Mody and W. Vandervorst, "Evolution of Metastable Phases in Silicon During Nanoindentation: Mechanism Analysis and Experimental Verification," Nanotechnology 20 (2009) 305705.

P. Eyben, N. Duhayon, D. Alvarez and W. Vandervorst, "Assessing the Resolution Limits of Scanning Spreading Resistance Microscopy and Scanning Capacitance Microscopy," Proceedings of the International Conference on Characterization and Metrology for ULSI Technology, 2003, pp. 678-684.

P. Eyben, M. Xu, N. Duhayon, T. Clarysse, S. Callewaert and W. Vandervorst, "Scanning Spreading Resistance Microscopy and Spectroscopy for Routine and Quantitative Two-Dimensional Carrier Profiling," J. Vac. Sci. Technol. B 20 (2002) 471-478.

P. Eyben, S Denis, T. Clarysse and W. Vandervorst, "Progress Towards a Physical Contact Model for Scanning Spreading Resistance Microscopy," Mat. Sci. Engineering B 102 (2003) 132-137.

A. Antons, R. Berger, K. Schroeder and B. Voigtlander, "Structure of Steps on As-passivated Si(111): Ab Initio Calculations and Scanning Tunneling Microscopy," Phys. Rev. B 73 (2006) 125327.

N.M. Miskovsky, S.-H. Park, P.H. Cutler and T.E. Sullivan, "Inelastic Processes in Time Dependent Tunneling in a Scanning Tunneling Microscope Junction," J. Vac. Sci. Technol. B 12 (1994) 2148-2152.

M.J. Hagmann, F.S. Stenger and D.A. Yarotski, "Linewidth of the Harmonics in a Microwave Frequency Comb Generated by Focusing a Mode-Locked Ultrafast laser on a Tunneling Junction," J. Appl. Phys. 114 92013) 223107.

M.J. Hagmann, P. Andrei, S. Pandey and A. Nahata, "Possible Applications of Scanning Frequency Comb Microscopy for Carrier Profiling in Semiconductors," J. Vac. Sci. Technol. B 33 (2015) 02B109.

M.J. Hagmann, S. Pandey, A. Nahata, A.J. Taylor and D.A. Yarotski, "Microwave Frequency Comb Attributed to the Formation of Dipoles at the Surface of a Semiconductor by a Mode-Locked Ultrafast Laser," Appl. Phys. Lett. 101 (2012) 231102.

W. E. McMahon and J.M. Olson, Atomic-Resolution STM Study of a Structural Phase Transition of Steps on Vicinal As/Ge(100), Phys. Rev. B 60 (1999) 1599-16005.

R.J. Hamers, "Atomic-Resolution Surface Spectroscopy with the Scanning Tunneling Microscope," Annual Rev. Phys. Chem. 40 (1989) 531-539.

M.J. Hagmann, A.J. Taylor and D.A. Yarotski, "Observation of 200th Harmonic with Fractional Linewidth of 10-10 in a Microwave Frequency Comb Generated in a Tunneling Junction," Appl. Phys. Lett. 101 (2012) 241102.

\* cited by examiner

METHOD OF CARRIER PROFILING UTILIZING DIELECTRIC RELAXATION

CROSS-REFERENCES TO RELATED APPLICATIONS

This Application claims priority as a non-provisional perfection of prior filed U.S. Application No. 62/276,678, filed Jan. 8, 2016, and incorporates the same by reference in its entirey.

FIELD OF THE INVENTION

The present invention relates to the field of carrier profiling in conductors and semiconductors and more particularly relates to a method by which a microwave frequency comb is used to measure dielectric relaxation in order to determine carrier density.

BACKGROUND OF THE INVENTION

Round-robin testing and status reviews have led the semiconductor industry to select scanning spreading resistance microscopy (SSRM) and scanning capacitance microscopy (SCM) as their primary methods for carrier profiling. SSRM is generally chosen below the 40 nm lithography node where finer resolution is required. The resolution for SSRM is thought to be as fine as 2.5 nm [K. Arstila, T. Hantschel, C. Demeulemeester, A. Moussa and W. Vandervorst, "Microfabricated diamond tip for nanoprobing," Microelectron. Eng. 86 (2009) 1222-1225] or even 1 nm [L. Zhang, H. Tanimoto, K. Adachi and A. Nishiyama, "1-nm spatial resolution in carrier profiling of ultrashallow junctions by scanning spreading resistance microscopy," IEEE Electron Dev. Lett. 29 (2008) 799-801]. However these dimensions are much smaller than the extent of the lattice distortion that is caused by the nanoindentation of the probes which is required in this destructive process [K. Mylvaganam, L. C. Zhang, P. Eyben, J. Mody and W. Vandervorst, "Evolution of metastable phases in silicon during nanoindentation: mechanism analysis and experimental verification," Nanotechnology 20 (2009) 305705] so it is possible that the results may not be an accurate characterization of the semiconductor.

New technology is required as the semiconductor industry progresses to finer lithography nodes for progress to new devices having improved performance in accordance with Moore's law. The first commercial products containing devices at the 22 and 14 nm nodes were introduced in 2012 and 2014, respectively. On Jul. $9^{th}$ of 2015 an alliance led by IBM Research announced production of the first 7 nm node test chips with functioning transistors. This step was made ahead of schedule because it had not been expected to occur until 2018-2019. Thus, even with SSRM, the rule-of-thumb in roadmaps for the semiconductor industry that the resolution for carrier profiling should be finer than 10% of the lithography node cannot be met now at the 7 nm node, or at the 5 nm and 2 nm nodes for which research is already in progress. To summarize, accurate carrier profiling with a resolution of 0.7 nm is now required at the 7 nm node and a resolution of 0.5 nm and 0.2 nm will be required at the 5 nm and 2 nm lithography nodes.

Unusually high carrier densities are required at the new lithography nodes. An approximate lower bound for the required majority carrier density c may be set by requiring that a sphere with radius r must contain at least 1 carrier so that $4\pi r^3 c/3 > 1$, or $c > 3/4\pi r^3$ where r is the dimension of the respective lithography node. Thus, c must be greater than $2.4 \times 10^{17}$, $7.0 \times 10^{17}$, $1.9 \times 10^{18}$, and $3.0 \times 10^{19}/cm^3$ at the 10 nm, 7nm, 5 nm, and 2 nm nodes.

Inherent Limit for the Resolution in Scanning Capacitance Microscopy:

In SCM a semiconductor is coated with a thin layer of oxide and a small metal tip is scanned across this surface. A bias voltage is applied to the tip to cause a depletion region immediately below the surface of the semiconductor and small changes in the capacitance of the depletion region are measured as this bias is varied. The carrier profile is determined from the derivative of the capacitance in respect to the bias voltage, dC/dV. This may be understood because an incremental change in the voltage causes an incremental change in the thickness of the depletion region which changes the capacitance, and the change in the thickness is proportional to the carrier density. Measurements show that the resolution with SCM is no finer than 15 nm [P. Eyben, N. Duhayon, D. Alvarez and W. Vandervorst, "Assessing the resolution limits of scanning spreading resistance microscopy and scanning capacitance microscopy," Proceedings of the International Conference on Characterization and Metrology for ULSI Technology, 2003, pp. 678-684]. This limitation may be understood because the measured capacitance includes fringing between the base of the depletion layer and the shank and connections to the tip. In this proposed application of scanning tunneling microscopy, the tunneling current decreases exponentially with distance whereas capacitance is proportional to the reciprocal of distance. Thus, this new method is not sensitive to the presence of the shank and the connections to the tip.

Inherent Limit For the Resolution in Scanning Spreading Resistance Microscopy:

The concept of electrical resistance is only valid when the carriers in a semiconductor travel distances that are three or more times the mean-free-path $\lambda (\lambda \approx 10$ to 100 nm) in order to have several scattering events. At shorter distances the carriers have only ballistic motion as they spread away from their source by diffusion caused by their differences in velocity, with the additional effects of electrical interaction. Thus, it is not clear how carrier profiling based on electrical resistance could have a resolution as fine as 2.5 nm or 1 nm. Scanning spreading resistance microscopy measurements may actually have several different mechanisms. For example, in carrier profiling by SSRM the ideal relation for spreading resistance, $R = \rho/4a$ (where $\rho$ is the resistivity and a is the radius of a circular contact), is replaced by the nonlinear relation $R = f(\rho)$ requiring calibration with standard samples [P. Eyben, M. Xu, N. Duhayon, T. Clarysse, S. Callewaert and W. Vandervorst, "Scanning spreading resistance microscopy and spectroscopy for routine and quantitative two-dimensional carrier profiling," J. Vac. Sci. Technol. B 20 (2002) 471-478]. Examples of calibration curves, log-log plots of the measured resistance vs. the known resistivity, are irregular with a mean slope of 0.6 for n-type structures. Furthermore, the contact between the probe and the semiconductor is not ohmic so current vs. voltage plots are nonlinear, and the measurements are also sensitive to surface states in the semiconductor [P Eyben, S. Denis, T. Clarysse and W. Vandervorst, "Progress towards a physical contact model for scanning spreading resistance microscopy," Mat. Sci. Engineering B 102 (2003) 132-137].

Previous uses of a Microwave Frequency Comb

The previous art pertaining to the use of a Microwave Frequency Comb (MFC) for characterizing semiconductors relates to two different methods, SCM and SSRM, which were previously used without the MFC and thus they have different inherent limits for their resolution.

(1) Depletion capacitance—U.S. Pat. No. 5,065,103 describes how to make electrical measurements of the depletion capacitance in order to determine the carrier concentration (though they claim dopant concentration) prior to the discovery of the MFC. More recently U.S. Pat. No. 8,601,607 describes how to measure the attenuation of the MFC with a reverse biased semiconductor. Thus a depletion layer is formed in the semiconductor and the effect of the depletion capacitance on the attenuation of the MFC is used to determine the carrier concentration (though it also claims dopant concentration). The resolution using this method would be limited by the fringing capacitance between the base of the depletion layer and the shank and connections to the tip as it is in SCM.

(2) Spreading resistance—U.S. Pat. No. 5,585,734 describes how to measure the spreading resistance to determine the carrier concentration prior to the discovery of the MFC. U.S. Published application 2015/0247809 describes how to use a MFC to measure the attenuation of the MFC, which is caused by the spreading resistance in order to determine the carrier concentration. However, it is noted that measurements of any resistance have an inherent limitation for their resolution.

SUMMARY OF THE INVENTION

In view of the foregoing disadvantages inherent in the known types of carrier profiling, this invention provides a new method of carrier profiling utilizing the principles of dielectric relaxation. As such, the present invention's general purpose is to provide a new and improved method of carrier profiling that is easily accomplished, utilizes equipment currently available, yields quantifiable results with minimal calibration, and is non-destructive and repeatable utilizing identical samples.

Elastic quantum tunneling from one electrode to another requires that there is an unoccupied state having the same energy at the surface of the second electrode. Thus, in a scanning tunneling microscope (STM) when the sample has a positive bias electrons only tunnel from the tip to unoccupied states in the sample so the unoccupied states are imaged. Conversely, when the sample is negatively biased electrons only tunnel from the occupied states in the sample to the tip so the occupied states of the sample are imaged [A. Antons, R. Berger, K. Schroeder and B. Voigtlander, "Structure of steps on As-passivated Si(111): Ab initio calculations and scanning tunneling microscopy," Phys. Rev. B 73 (2006) 125327].

However, in laser-assisted scanning tunneling microscopy there is also an inelastic contribution to the tunneling current [N. M. Miskovsky, S.-H. Park, P. H. Cutler and T. E. Sullivan, "Inelastic processes in time dependent tunneling in a scanning tunneling microscope junction," J. Vac. Sci. Technol. B 12 (1994) 2148-21 52]. A quasi-periodic inelastic component of the tunneling current may be generated by focusing a passively mode-locked laser on the tunneling junction of a scanning tunneling microscope (STM) [M. J. Hagmann, F. S. Stenger and D. A. Yarotski, "Linewidth of the harmonics in a microwave frequency comb generated by focusing a mode-locked ultrafast laser on a tunneling junction," J. Appl. Phys. 114 (201 3) 223107]. For example, a laser with an average output power of 60 mW emitting 15 fs pulses of radiation at a repetition frequency of 74.254 MHz causes a pulse of $N_0 \approx 360$ electrons to be superimposed on the dc tunneling current during each laser pulse [M. J. Hagmann, P. Andrei, S. Pandey and A. Nahata, "Possible applications of scanning frequency comb microscopy for carrier profiling in semiconductors," J. Vac. Sci. Technol. B 33 (201 5) 026109]. The term "microwave frequency comb" (MFC) is appropriate for these phenomena because in the frequency domain the quasi-periodic pulse sequence is equivalent to a series of harmonics at integer multiples of the laser pulse repetition frequency. With a metal sample electrode in the STM the $200^{th}$ harmonic at 14.85 GHz has a signal-to-noise ratio of 20 dB and a linewidth (full-width at half-height) of less than 1 Hz which sets the present state-of-the-art for a narrow linewidth microwave source. Furthermore, the MFC is readily measured by connecting a suitable detector to any point on the metallic sample.

When a semiconductor is used as the sample electrode the means for carrier transport in the sample are much slower and dispersive with much greater attenuation so it is necessarily to receive the MFC on the sample within less than 1 mm of the tunneling junction. It is also necessary to use a laser having a photon energy less than the bandgap energy of the semiconductor to avoid creating electron-hole pairs which create surge currents to cause a different type of MFC which is independent of the tunneling and thus the source is not localized at a specific spot on the semiconductor [M. J. Hagmann, S. Pandey, A. Nahata, A. J. Taylor and D. A. Yarotski, "Microwave frequency comb attributed to the formation of dipoles at the surface of a semiconductor by a mode-locked ultrafast laser," Appl. Phys. Lett. 101 (2012) 231 102]. It is preferred to use a forward-biased tunneling junction, for which the sample is negative when it is n-type and positive when it is p-type, because this increases the dc tunneling current which increases the amplitudes of the harmonics. Furthermore, a reverse-biased tunneling junction would cause a depletion region that would interfere with the transport within the semiconductor.

With a semiconductor sample in a forward-biased tunneling junction, as with a metal sample, there are still about 360 electrons superimposed on the dc tunneling current during each laser pulse. Then for a p-type semiconductor each pulse of the laser causes a spot of highly-localized negative space charge at the surface of the semiconductor due to the injection of excess electrons. For an n-type semiconductor each laser pulse causes a spot of highly-localized positive space charge at the surface of the semiconductor due to the local deficiency of electrons caused by the tunneling of electrons to the tip.

Methods for obtaining atomic resolution for imaging [W. E. McMahon and J. M. Olson, "Atomic-resolution STM study of a structural phase transition of steps on vicinal As/Ge(100), Phys. Rev. B 60 (1999) 15999-16005] as well as spectroscopy [R. J. Hamers, "Atomic-resolution surface spectroscopy with the scanning tunneling microscope," Annual Rev. Phys. Chem. 40 (1989) 531-539] of semiconductors by scanning tunneling microscopy are well known (e.g. atomically-sharp tips, small tip-sample spacing without causing surface modification, etc.) which is consistent with our simulations showing that more than 50% of the dc tunneling current may be coupled to a region with the size of a single atom. Thus, the highly-localized space charge that is caused by each laser pulse is located in a region with atomic size.

Dielectric relaxation, in which the carriers move to neutralize local space charge, is generally considered in terms of resistance and capacitance for an exponential decay with a time constant $\tau_r = \sigma/\epsilon$ that is typically a few ps in semiconductors, where $\sigma$ conductivity and $\epsilon$ is the permittivity of the medium. However, even for distances less than a mean-freepath, relaxation will occur due to electrical interaction and diffusion. With a p-type semiconductor each laser pulse causes injected electrons, as excess minority carriers, to form a highly-localized negative space charge. Mutual repulsion of the electrons and diffusion due to their differences in velocity will cause them to move outward while the holes, as majority carriers, are attracted to move inward to initiate dielectric relaxation. For an n-type semiconductor each laser pulse causes expelled electrons to leave a highly-localized space charge consisting of positive ions. The ions will have some outward motion due to their mutual repulsion but because of the heavier mass of the ions the major movement will be by the electrons, as the majority carriers, as they are attracted to move inward to initiate dielectric relaxation.

Note that the inward and outward radial motion both contribute to an inward electrical current for the p-type semiconductor and an outward electrical current for the n-type semiconductor. It is convenient to use the approximation of spherical symmetry to illustrate the principles that are involved. The initial spot of highly-localized space charge is at the center of an outward moving sphere and the majority carriers continue to move inward from greater distances until dielectric relaxation is completed when the radius is given by $$R = \left(\frac{3N_0}{4\pi c}\right)^{\frac{1}{3}},$$

which has typical values of 20, 16, and 12 nm for $N_0=360$ and majority carrier concentrations of $c=1\times10^{19}$, $2\times10^{19}$, and $5\times10^{19}/cm^3$, respectively. It is important to note that the total time for dielectric relaxation is generally much less than the time that is required for recombination of the carriers. Thus, there is local neutralization of charge but the carriers continue to move beyond the radius R in ambipolar transport.

Table I shows how the present invention is related to the two previous technologies that have already been presented using SFCM for carrier profiling.

TABLE I

Comparison of the three different technologies.

| Pat. | Mechanism | Transport | Distance | Biasing | Finest resolution |
| --- | --- | --- | --- | --- | --- |
| U.S. Pat. No. 8,601,607 | Attenuation by depletion region | Ambipolar | Large | Reverse required | 20 nm |
| Published application 2015/0247809 | Attenuation by spreading resistance | Ambipolar | Large | Forward to avoid depletion | 2 nm |
| Present Invention | Dielectric relaxation | Largely Ballistic | Uniquely Small | Forward to avoid depletion | 0.2 nm |

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the method is herein described. It should be noted that the articles "a," "an," and "the" as used in this specification, include plural referents unless the content clearly dictates otherwise.

Figure 1:
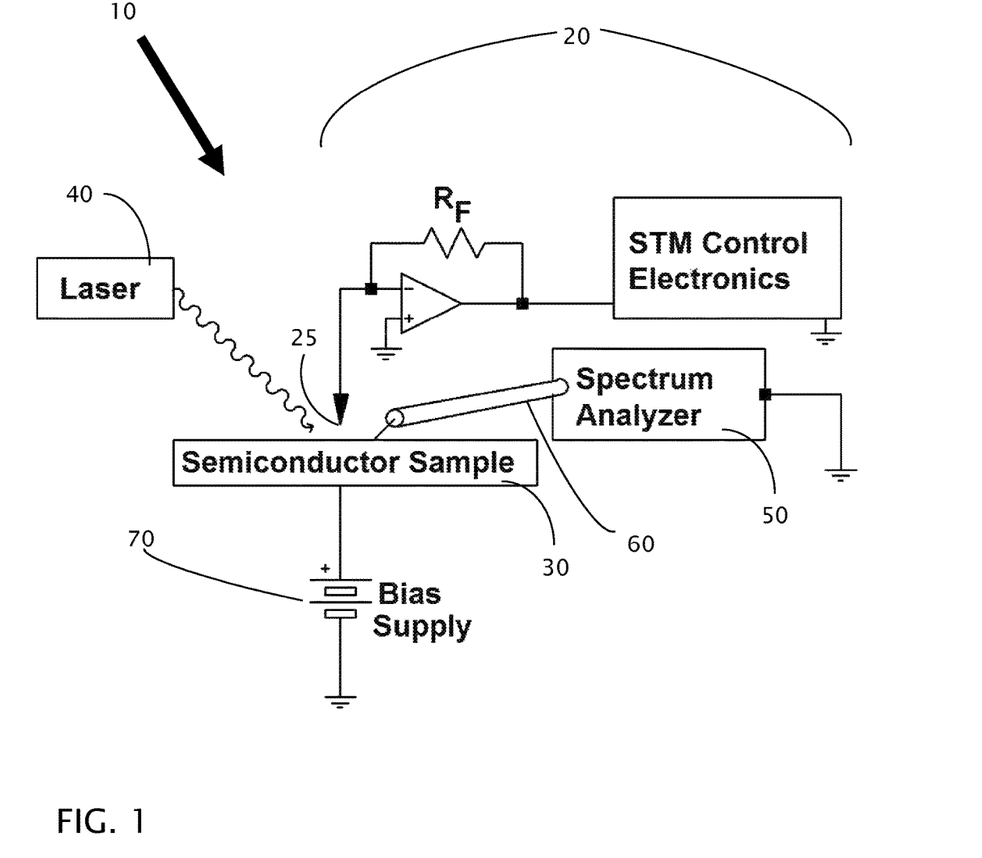
FIG. 1 is a schematic detailing an apparatus for the method.

With reference to FIG. 1, a scanning tunneling microscope is set up similarly to what is described in U.S. Pat. No. 9,442,078 (2016), also by this Inventor. This Patent is incorporated by reference in its entirety herein. In one embodiment, an apparatus set-up 10 is a scanning tunneling microscope 20 positioned over a sample 30 onto which a mode-locked laser 40 is focused so that the laser emits a beam onto the tunneling junction between the STM 20 and the sample 30. The semiconductor sample 30 is forward biased 70, as is shown in FIG. 1 where a p-type semiconductor 30 is used and the voltage on the STM tip 25 is set to make the tip negative, thus allowing the carriers in the semiconductor sample to remain in the region directly beneath the tip. A spectrum analyzer 50 is connected into the circuit by means of a microwave probe 60 making ohmic contact with the sample 30 in close proximity to the tunneling junction.

Figure 2:
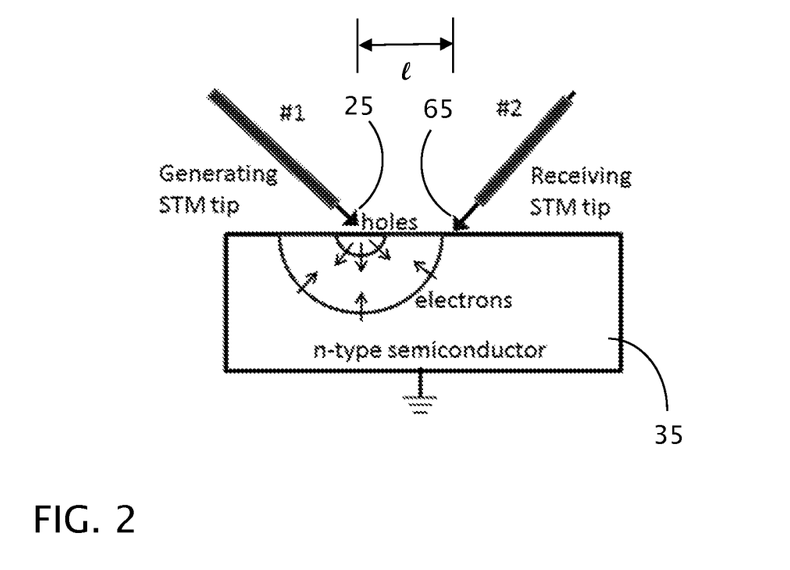
FIG. 2 is a schematic illustrating dielectric relaxation on an alternate apparatus.

It is convenient to refer to the tunneling junction as the "transmitter" of the microwave frequency comb, and the second probe tip as the "receiver" or "receiving probe." The receiving probe 65 may be any type receiver making contact, such as an ohmic contact, as is shown in FIG. 2. In some applications it may be possible to use a point-contact, such as with a fine gold wire as the receiver. It should also be noted that the sample 35 in FIG. 2 is an n-type semiconductor. Standard concerns and adaptations for polarity, for instance using a p-type semiconductor, are considered part of the invention.

In the following analysis $N_0$ is defined as the number of excess minority carriers injected into the semiconductor at time t=0, n is the local density of these excess minority carriers in the semiconductor, and c is the local density of majority carriers in the semiconductor.

Consider a spherical model where $N_0$ excess minority carriers are injected to a small region centered at the origin at time t=0. Electrical forces cause the injected carriers to move radially outward and the majority carriers in the semiconductor, having density c, to move radially inward to complete dielectric relaxation within a sphere of radius R, where $$R = \left(\frac{3N_0}{4\pi c}\right)^{\frac{1}{3}} \tag{1}$$

These two sets of carriers with opposite signs move in opposite directions to contribute to a flow of current having the same direction. This current may be approximated as a Gaussian pulse where the local density of the excess minority carriers is given by the following expression which allows for the effects of spreading as well as termination at r=R. Here γ is a normalization constant:

$$n = \frac{\gamma N_0}{r^2}\left[1 - \left(\frac{r}{R}\right)^3\right]e^{-k(r-vt)^2} \tag{2}$$

At a specific time $t_1$, when the peak for this pulse is at $r_1=vt_1$, let $x \equiv r-r_1$ so that local density of excess majority carriers is given by $$n = \frac{\gamma N_0}{r^2}\left[1 - \left(\frac{r}{R}\right)^3\right]e^{-kx^2} \tag{3}$$

The short initial duration for the pulse may be assumed to cause the coefficient k to be large so that the pulse will have a short radial extent. Now this approximation is used to evaluate the normalization constant by equating two expressions for the total number of excess carriers with a specific value for the radius r at the peak.

$$N_0\left[1 - \left(\frac{r}{R}\right)^3\right] = \frac{\gamma N_0}{r^2}\left[1 - \left(\frac{r}{R}\right)^3\right]4\pi r^2 \int_{-\infty}^{\infty} e^{-kx^2}\,dx \tag{4}$$

$$\text{But } \int_{-\infty}^{\infty} e^{-kx^2}\,dx = \sqrt{\frac{\pi}{k}} \tag{5}$$

$$\text{Thus } \gamma = \frac{1}{4}\sqrt{\frac{k}{\pi^3}} \tag{6}$$

$$\text{so that } n = \sqrt{\frac{k}{\pi}}\frac{N_0}{4\pi r^2}\left[1 - \left(\frac{r}{R}\right)^3\right]e^{-k(r-vt)^2} \tag{7}$$

Thus, the current received by a probe with area $A \ll 4\pi r^2$ located at a fixed value of r is given by $$I(r, t) = evAn \tag{8}$$

$$I(r, t) = \sqrt{\frac{k}{\pi}}\frac{evAN_0}{4\pi r^2}\left[1 - \left(\frac{r}{R}\right)^3\right]e^{-k(r-vt)^2} \tag{9}$$

Assume that the probe is connected to an ideal load, having resistance $R_L$ but no capacitance or inductance. During each pulse, the power that is delivered to the load is given by $$P(r, t) = \frac{kR_L}{\pi}\left(\frac{evAN_0}{4\pi r^2}\right)^2\left[1 - \left(\frac{r}{R}\right)^3\right]^2 e^{-2k(r-vt)^2} \tag{10}$$

Thus, the energy that is delivered to the load during each pulse is given by $$E(r) = \frac{kR_L}{\pi}\left(\frac{evAN_0}{4\pi r^2}\right)^2\left[1 - \left(\frac{r}{R}\right)^3\right]^2 \int_{-\infty}^{\infty} e^{-2kv^2 t'^2}\,dt' \tag{11}$$

$$E(r) = \frac{kR_L}{\pi}\left(\frac{evAN_0}{4\pi r^2}\right)^2\left[1 - \left(\frac{r}{R}\right)^3\right]^2 \sqrt{\frac{\pi}{2kv^2}} \tag{12}$$

$$E(r) = R_L v\sqrt{\frac{k}{2\pi}}\left(\frac{eAN_0}{4\pi r^2}\right)^2\left[1 - \left(\frac{r}{R}\right)^3\right]^2 \tag{13}$$

Finally, the power that is delivered to the load is given by the following expression where $f_p$ is the pulse repetition frequency of the laser:

$$P(r) = R_L f_p v\sqrt{\frac{k}{2\pi}}\left(\frac{eAN_0}{4\pi r^2}\right)^2\left[1 - \left(\frac{r}{R}\right)^3\right]^2 \tag{14}$$

The power spectral density may be determined by taking a Fourier transform to evaluate the power that would be received at each harmonic of the microwave frequency comb. Alternatively a Fourier series may be used for this calculation because of the quasi-periodic nature of the excitation by a mode-locked laser.

Equations (15) and (16) give the peak value of the current as the pulse crosses a sphere with radius r, and the total power that would be measured in the microwave frequency comb at the distance r. Here Eq. (17) defines F, the fraction of the total current that is subtended by the probe.

$$I_p(r) = evF\sqrt{\frac{k}{\pi}}\left(N_0 - \frac{4\pi r^3}{3}c\right) \tag{15}$$

$$P(r) = e^2 v F^2 f_p R_L\sqrt{\frac{k}{2\pi}}\left(N_0 - \frac{4\pi r^3}{3}c\right)^2 \tag{16}$$

$$F = \frac{A}{4\pi r^2} \tag{17}$$

Figure 3:
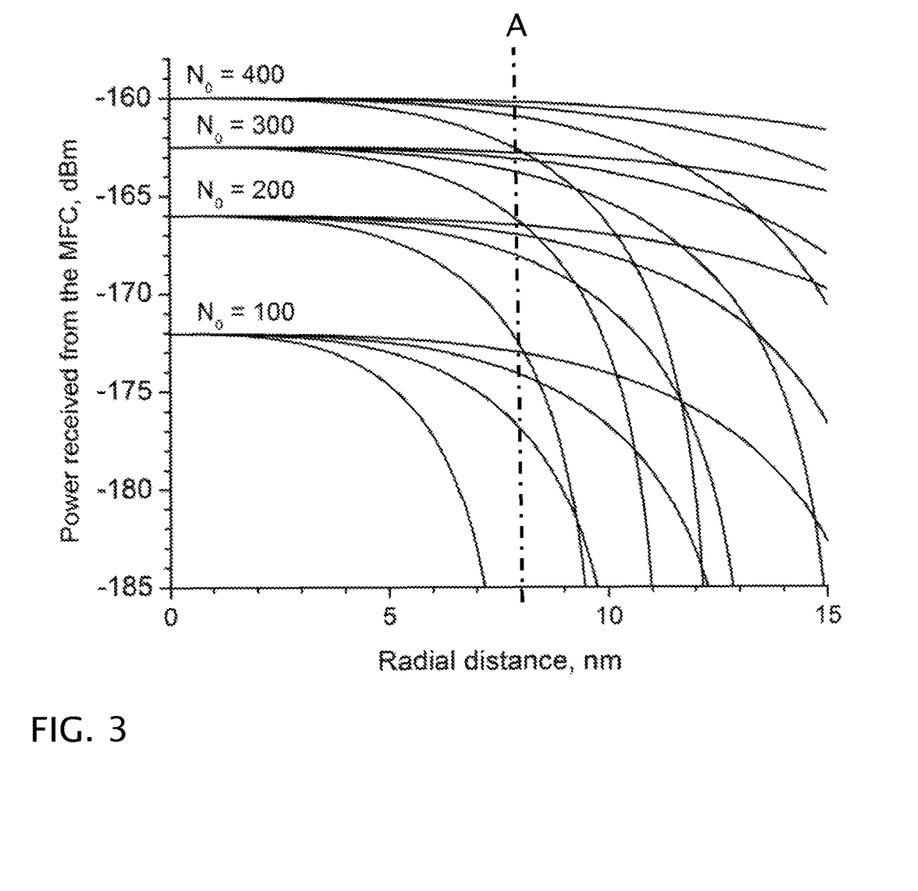
FIG. 3 is a graph depicting received power in dBm vs. radial distance from the transmitting tunneling junction.

FIG. 3 shows the received power calculated in dBm as a function of the radial distance from the tunneling junction which is the source of the microwave frequency comb.

These calculations were made using Eq. (16) with the following parameters: $k=2\times10^8$/m, $v=1.16\times10^6$ m/s corresponding to 1 eV electrons in silicon, $F=10^{-3}$, $f_p=74.254$ MHz, and $R_L=50\Omega$. The values for the pulse repetition rate, load resistance, and the range in sensitivity that are required are consistent with those already used in other measurements [M. J. Hagmann, A. J. Taylor and D. A. Yarotski, "Observation of $200^{th}$ harmonic with fractional linewidth of $10^{-10}$ in a microwave frequency comb generated in a tunneling junction," Appl. Phys. Lett. 101 (2012) 241102].

These calculations were made for four values of $N_0$, as shown in FIG. 3. The four separate curves for each value of $N_0$ correspond to $c=5\times10^{18}$, $1\times10^{19}$, $2\times10^{19}$, and $5\times10^{19}$/cm$^3$, where the curves fall off faster as the value of c is increased because a smaller volume of the semiconductor is required for neutralization.

Figure 4:
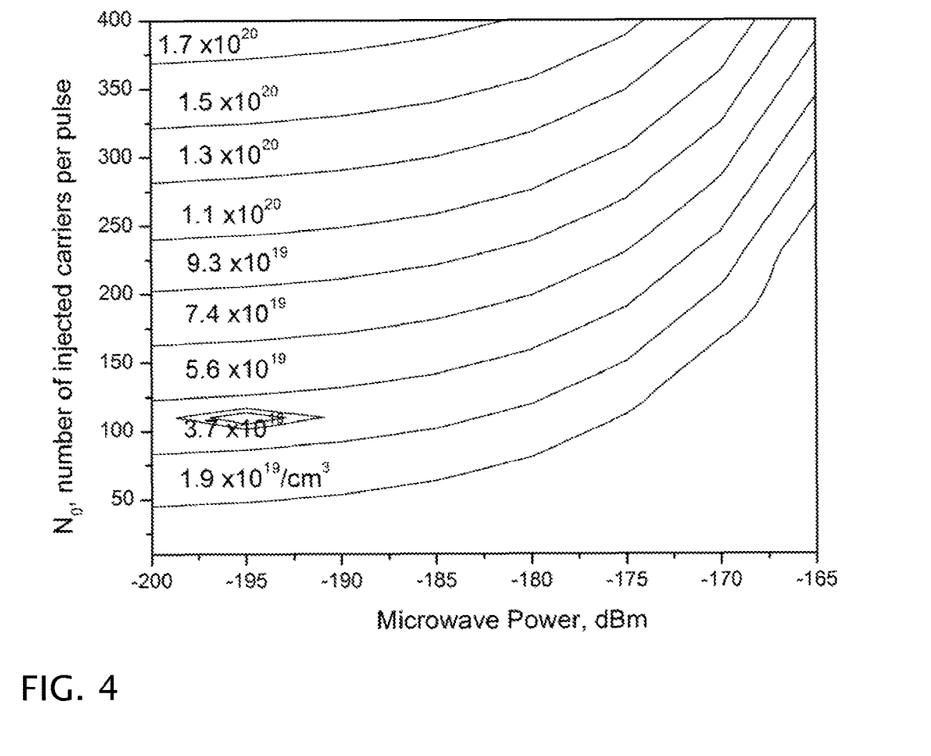
FIG. 4 is a graph depicting Contours for 9 different values of the carrier concentration as a function of the number of injected carriers per pulse and the measured microwave power for a tip-probe distance of 8 nm, as shown by line A in FIG. 3.

It is possible to determine the local value of the carrier density c in the semiconductor by making measurements when the tunneling junction is at one or more points on the semiconductor. This is possible by measuring the total microwave power and its spectrum in the microwave frequency comb. It is possible to obtain additional information by measuring the microwave frequency comb as a function of the distance from the tunneling junction but it is preferable to only make measurements when this distance is held constant. This may be understood because of the errors that are caused by temperature dependence, hysteresis, and non-linearity in various means for positioning the probe and the time required for the additional measurements. By contrast, it is a relatively simple matter to accurately change the value of $N_0$ by varying the power flux density of the laser. FIG. 4 shows that at a fixed distance the contour of $N_0$ vs. microwave power is a unique function of the carrier concentration.

It stands to reason that the distance between the transmitter and receiver 1 must be less than a given r in order to accurately measure the dielectric relaxation phenomena before the carriers in the semiconductor neutralize the space charge. Therefore, it is suitable to have both transmitter and receiver mobile in relation to each other and the sample. The distance e may be on the order of 8-10 nm or even closer as semiconductors with higher dopant concentrations are used. Adjustments to power output and location of the transmitter and receiver may also be used to accomplish 3D carrier profiling of a given sample.

Characterization of the carrier density may be made by taking measurements of the power at specific fixed distances $l_1, l_2, l_3 \ldots$ and curve fitting to extrapolate at which distance $l_f$ the power will be fully attenuated. Alternatively, power may be measured by increasing or decreasing distances $l_1$, $l_2, l_3 \ldots$ until the null point $l_f$ is found. Distances l may be achieved by relative motion of the receiver to the transmitter, which may involve either or both transmitter and receiver moving.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A method for determining carrier density in a semiconductor, the method comprising:
   a. positioning a semiconductor sample in a scanning tunneling microscope such that a tunneling junction is formed between the sample and a tip of the scanning tunneling microscope;
   b. electrically biasing the sample such that a tunneling current is generated and no depletion region is formed in the sample;
   c. positioning a receiving probe on the semiconductor sample proximate the tunneling junction at a distance l;
   d. focusing a mode-locked laser on the tunneling junction and generating surges of minority carrier surface charge on the semiconductor by modulating the tunneling current with the mode-locked laser, thereby creating a microwave frequency comb therein;
   e. characterizing decay of the microwave frequency comb due to dielectric relaxation by taking measurements of power from the microwave frequency comb at a plurality of different distances l;
   f. determining carrier density of the semiconductor from the characterized decay of the microwave frequency comb.

2. The method of claim 1, a distance between the tunneling junction and receiving probe being less than the mean-free-path of majority carriers in the sample, such that electrical resistance is not defined and sub-nanometer resolution of carrier density is made possible.

3. The method of claim 1, wherein the distances l are attained by moving the receiving probe relative to the tunneling junction certain fixed distances, and power measured at said fixed distances is used to extrapolate the point at which dielectric relaxation is complete.

4. The method of claim 1, wherein the distances l are attained by moving the receiving probe relative to the tunneling junction and measurements are made until the point at which dielectric relaxation is complete is found.

* * * * *